H. PEARCE, T. R. G. PARKER & W. E. BENNISON.
AUTOMATIC APPARATUS FOR MACHINING CURVED STEREOTYPE PLATES.
APPLICATION FILED OCT. 26, 1914.

1,233,698.

Patented July 17, 1917.
7 SHEETS—SHEET 3.

Witnesses:—
C. S. Hartnett
M. S. Healy

Inventors
H. PEARCE
T. R. G. PARKER
W. E. BENNISON
by Southgate & Southgate
Attorneys.

H. PEARCE, T. R. G. PARKER & W. E. BENNISON.
AUTOMATIC APPARATUS FOR MACHINING CURVED STEREOTYPE PLATES.
APPLICATION FILED OCT. 26, 1914.

1,233,698.

Patented July 17, 1917.
7 SHEETS—SHEET 5.

Witnesses:—
C. C. Hartnett
M. S. Healy

Inventors—
H. PEARCE
T. R. G. PARKER
W. E. BENNISON
by Southgate & Southgate
Attorneys.

H. PEARCE, T. R. G. PARKER & W. E. BENNISON.
AUTOMATIC APPARATUS FOR MACHINING CURVED STEREOTYPE PLATES.
APPLICATION FILED OCT. 26, 1914.

1,233,698.

Patented July 17, 1917.
7 SHEETS—SHEET 6.

Witnesses:—

Inventors—
H. PEARCE
T.R.G. PARKER
W.E. BENNISON
by Southgate & Southgate
Attorneys.

UNITED STATES PATENT OFFICE.

HERBERT PEARCE, THOMAS ROBERT GILLETT PARKER, AND WILLIAM EDWARD BENNISON, OF BROADHEATH, ENGLAND, ASSIGNORS TO WOOD NEWSPAPER MACHINERY CORPORATION, OF NEW YORK, N. Y., A CORPORATION OF VIRGINIA.

AUTOMATIC APPARATUS FOR MACHINING CURVED STEREOTYPE-PLATES.

1,233,698. Specification of Letters Patent. Patented July 17, 1917.

Application filed October 26, 1914. Serial No. 868,748.

*To all whom it may concern:*

Be it known that we, HERBERT PEARCE, THOMAS ROBERT GILLETT PARKER, and WILLIAM EDWARD BENNISON, subjects of the King of Great Britain, residing at Broadheath, in the county of Chester, England, have invented a new and useful Automatic Apparatus for Machining Curved Stereotype-Plate, of which the following is a specification.

This invention consists of improvements in automatic apparatus for machining curved stereotype plates moved through it along a runway with alternate motion and dwell, by a horizontally reciprocating traverser, the machining including cooling the cast plates.

There are known at the present time, different types of automatic apparatus, each more or less for the purpose stated and which types, taking them in chronological order, are respectively characterized by the following features:

(*a*) Casting two plates of the same length and weight simultaneously in as many horizontal molds axially alined with each other and consisting of a hollow cylinder either side of which serves in turn as core to a cope thereunder; turning the cylinder about its axis through half a circle after each cast to carry the plates out of their molds, the other side of it at the same time making with the said cope, the mold for the next cast; engaging one end of the crown of each plate by a traverser which by a horizontal movement in a guide fixed above the plate crowns, moves one of the plates along fixed horizontal ways and through a vacant space intermediate of the adjacent ends of the molds and a shaving arch into the latter, and the other of them into the said space, the next similar movement of the traverser moving the last mentioned plate into the said arch, thereby making it push its predecessor out of the same; truing the straight sprue-edge of each plate as it is being moved toward the shaving arch, by a saw rotating in its path about a fixed axis, and, when it is within, and clamped to, the said arch, boring its concave face, truing both its ends, and removing unnecessary metal from near the page heading to improve the effective relief of the latter.

(*b*) Laying an unmachined plate fresh from an independent mold with its straight side edges resting upon an inclined runway down which it slides by gravity as soon as an automatic stop engaging its two leading side edges releases it, so that it moves past or over rotating cutters which true its straight side edges, into the shaving arch up to a stop automatically pushed into the path of its crown, or into that of each of its two leading side edges at a level just above its straight side edges; raising it off the runway up to the arch, clamping it to the latter, subjecting it to a preliminary cooling, shaving its concave face and perfecting its ends; unclamping, lowering and releasing it, whereupon it slides farther down the said runway into the main cooler; projecting a stop into its path as it approaches that cooler and turning a cooling spray on to both its faces as it enters, the stop being withdrawn by the approach of the succeeding plates, whereupon the cooled plate slides farther down the runway between rotary drying brushes on to an exposed part of the runway and against a stop there.

(*c*) Springing the sides of a plate toward each other by automatic jaws engaging its typeless margins just before it is raised up off the runway, disengaging them just before clamping and reëngaging them just before lowering and disengaging again after lowering, the object being to prevent the side type surfaces of the plate being scrubbed against the sides of the arch, the jaws being worked by means independent of the plate-raising and -lowering means. Applying the water to only the concave face of a plate and securing an even delivery of water through the crown of the inclined saddle by dividing it transversely into compartments to each of which was assigned a special supply pipe and delivery port.

(*d*) Preventing the rebound of a plate from the exit stop of the shaving arch by a pivoted stop which is held by a spring in the path of a plate entering the arch, rocked out of its path by the plate's momentum and pulled back into that path and locked in contact with the following end of the plate as soon as the latter has come up to the said exit stop.

(e) Holding the supply valve of the main cooling spray normally open by its own spring, automatically closing it by a cam and locking it closed, by a lever which is rocked to unlock the valve by either the exit stop at the shaving arch or by the approach of the plate to its cooling position, the work of so rocking the lever being eased by the said cam which, at that moment, tends to close the valve and does close it as soon as the cooled plate is ready to slide away from the cooling position.

The above-mentioned improvements respectively relate to:
1. The horizontal plate traverser:
2. The plate-rebound preventer and absorber:
3. The plate-springing-in jaws:
4. The means for locating a plate at the head of the runway:
5. The plate-stop at the exit end of the shaving arch: and
6. The main cooler.

The accompanying figures illustrate a preferred constructional form of the invention. In them—

Fig. 12 is a detail plan;
Fig. 13, a longitudinal section.

Figure 13:
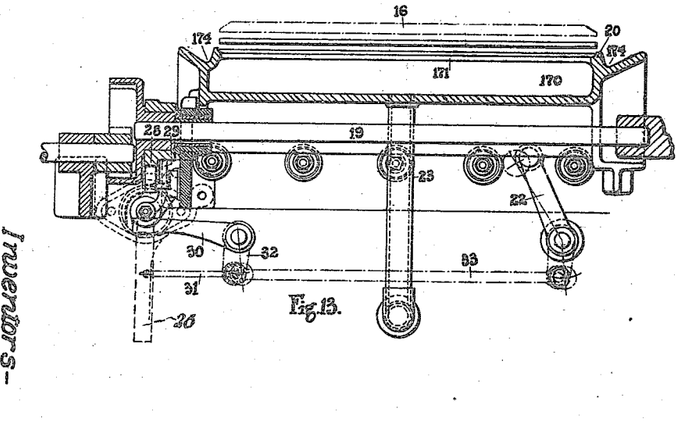
Figure 14:
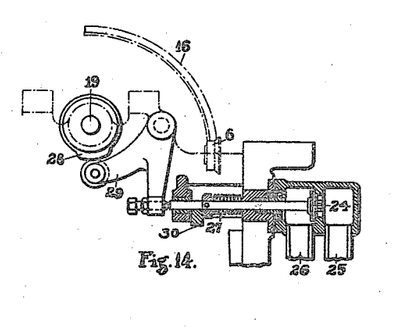
Fig. 14, a detail front elevation of the main cooler.

1, 1 are the two side frames of the apparatus duly braced together to constitute the main frame of the latter; 2, a fixed central plate-receiving table alined with the runway; 3, 4, a fixed plate receiving table on each side of the table 2 to receive plates when that on the said table has not yet been pushed forward off it; 5, 6, the two series of rollers constituting the runway; 7, the shaving arch; 8, the cam shaft; 9, 10, the cams for respectively raising the plate-support 11 and the plate-clamp 12; 13, the cam for working the springing-in jaws 14, 14; 15 is the boring knife for shaving the concave face of a plate 16, and 17, 18, the knives for respectively grooving the leading and following ends, all on the shaft 19. The main cooler consists of a saddle 20 having external horizontal ribs 21, feed pipe 23 controlled by valve 24 having feed and exhaust pipes 25, 26, opening spring 27, closing cam 28 fast on shaft 19 and closing lever 29 (see Figs. 13 and 14). A lever 30 rocked by spring 31 through a connection 32 to positively hold the valve 24 locked after it has been closed. It is unlocked by a plate 16 through arm 22 and connection 33, as the said plate is being traversed into cooling position over the saddle 20. The spring 27 can then open it and hold it open until the said plate clears the arm 22 as it is being traversed to the high speed drier 34. This is driven by gear 35 from the said shaft 19. 36 is a motor connected by a belt drive 37 to a driving pulley 38 fast on a transverse shaft 39 carrying a worm 40 engaging a worm gear 41 on the shaft 19. The cam shaft 8 above-mentioned is driven at the same rate as the shaft 19 by an intermediate and suitably proportioned train of gears 42, 43, 44. 45 is a stationary arch serving as a gear-guard. All the foregoing parts are well-known.

*Improved horizontal plate-traverser.*—One object of this part of the invention is to adapt an apparatus of the stated type to machine plates of different lengths and weights. This is attained by a combination of a horizontally reciprocating traverser bar on each side of the apparatus at the level of the runway; a finger on each bar for each separate forward motion of the plate, the fingers on one bar being respectively opposite those on the other, and located thereon to engage with the following end of a plate so as to pull it along the runway; means for making the fingers, during their return motions, clear the respective plates; means for replacing them in plate-engaging positions in time for their next traversing motions; and means for reciprocating the two bars in unison.

This capacity for machining plates of different lengths and weights is of grave importance at the present time. Apparatus of the type (a) above described, reached, at the time it was brought out, now about sixteen years ago, the high water mark of excellence in automatic stereotype plate making machinery. But although it was developed far enough in the direction of dealing with more than one plate at a time, to cast and machine two plates at a time, it limited itself to these two plates being of the same length and weight. It has a single horizontal traverser with two dependent fingers, the traverser working in a guide fixed above the crowns of the plates. Since that time a demand has arisen for apparatus capable of casting more than one length and consequently weight, of plate. The characteristic feature of the (b) type of apparatus from the traverser point of view, was that the plates, cast in a separate apparatus, were carried by gravity one after the other down an inclined runway from one end of it to the other. It is quite a common thing at the present time, to supply apparatus capable of casting three different sizes and weights of plate, and as soon as such apparatus was on the market, apparatus of type (b) were made which could machine all those sizes. Now seeing that apparatus of type (a) was limited to a single length and weight of plate, it follows that the practical problems in machining plates caused by differences in length or in weight or in both, could not occur with that type and that the latter could not offer any solution of them.

Use of the type (b) has shown the following:—

(I) As to differences in length. A plate sliding down its runway may engage either the stop at the exit end of the shaving arch by its crown, or the stops by its sides, as already explained. As between a long and a short plate, each engaging the stop by its crown, the following end of the long plate, in our opinion, tends to, and sometimes actually does, kick up, but that of a short plate does not. In the case of plates engaging the stops by their sides, the following end of a short plate kicks up and that of a long plate does not.

(II) As to difference in weight as well as in length. The momentum of any plate is according to the well known law and these differences are beyond the control of the apparatus that has to machine them and are, so to speak, unknown to it. It follows, therefore in our opinion, that it is impossible to prevent the plates in a gravity traverser apparatus from kicking up or to secure a regularity in rebound from the stop or stops.

(III) It has always been necessary to provide for a little lateral play on the part of a plate sliding down the runway, and the unmachined plates although they might have been cast in the same mold, varied a little in radius, the consequence being that although a plate might be set with the leading ends of its sides up to stops at the head of the runway which would be withdrawn out of its path to let it slide down the runway, it would do the latter on the skew. But with a horizontal traverser pulling a plate from both sides of its following end, the plate must travel with its leading end at right angles with the runway.

In the illustrated constructional form of the above mentioned combination,—see Figs. 2, 4 to 6, 15 and 16—46 is a horizontal traverser bar working in a suitable guide in or on the respective side frame 1. These two bars 46 are replicas of each other and are at every moment opposite each other whether they are at rest or whether they are at work. A traverser has as many motions and dwells in each operative traverse of it from the plate-receiving end of the apparatus to the opposite one, as there are fixed positions in which some part of the whole machining is done to the plate. For instance, in the apparatus illustrated there are shown three such fixed positions, (a) the shaving arch 7, (b) the main cooler 20 and (c) the drier 34. Consequently, the improved traverser for such an apparatus must have three motions, each one succeeded by a dwell, the first motion being from the starting position into the shaving arch 7; the second out of that arch to over the main cooler saddle 20; and the third from over that saddle to over the drier 34. Each motion is followed by a dwell during which the respective part of the whole machining is done to the plate, that is to say, boring and end grooving in the arch 7, cooling while the bored and end-grooved plate is over the saddle 20; and drying the concave face wetted by the cooler, while the cooled plate is over the drier 34. The invention imposes no limit to the number of positions and the consequent motions and dwells.

The traversing and return motions of a traverser have, preferably, a common rate. Further, the combined term of a return and a traversing motion, is approximately the same as that of a dwell.

There is a pair of fingers for each of the above-mentioned fixed positions, and all the fingers are, functionally, replicas of each other. A finger 47—see Fig. 18—is pivoted upon a vertical pivot 48 fast in the respective traverser bar and works in a horizontal plane in a transverse seating 49 formed in the bar 46 between its top and bottom faces. It is so proportioned and its pivot 48 so positioned with reference to the bar 46, that when it is in plate-engaging position, its engaging or traversing face 50 stands at right angles with the said bar. Its opposite face 51 may be either parallel with the face 50 or sloped off toward it. It has two terminal positions, one for the traversing motion and the other for the return motion, and during the latter, it is disengaged from the respective plate so far as to clear it. These two positions are at right angles with each other, and a finger is locked in either at a time by any suitable device such as two flats 52 correspondingly positioned on the pivot 48 and a spring-pressed plunger 53 working in a cavity 54 in an extension 55 of a finger, always pressing upon one of the flats 52 excepting during the time that the finger is being moved from one of its terminal positions to the other. The front side 56 of the seating 49, being that from which a finger starts on its traversing motion, is so positioned, that during that motion, it serves as an abutment for holding the finger up to its work throughout it.

Figure 1:
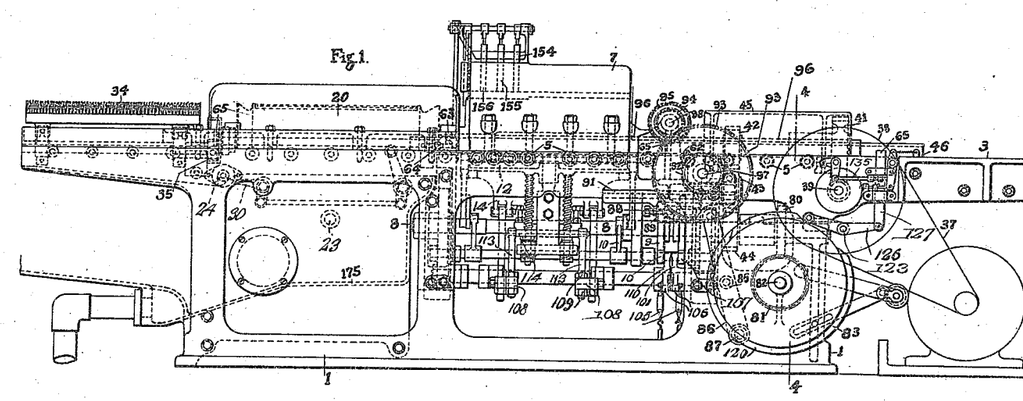
Figure 1 is a side elevation.
Figure 2:
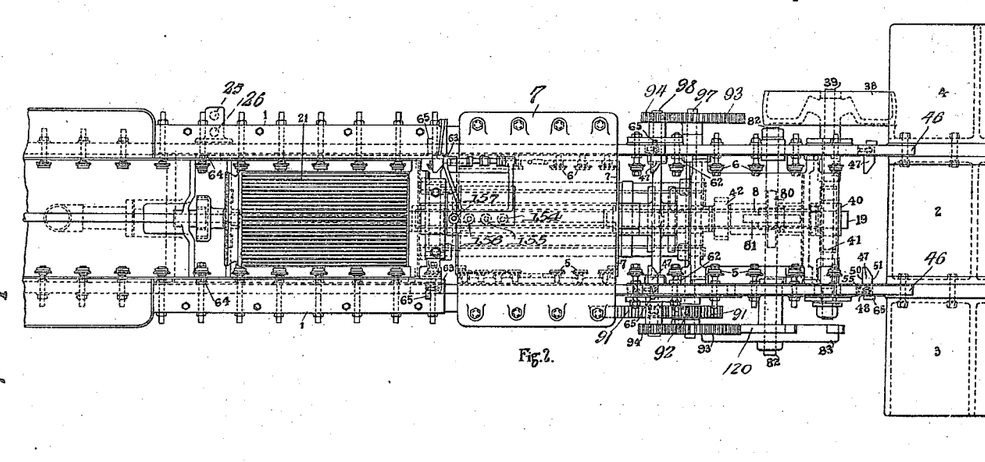
Fig. 2 is a plan corresponding therewith.
Figure 15:
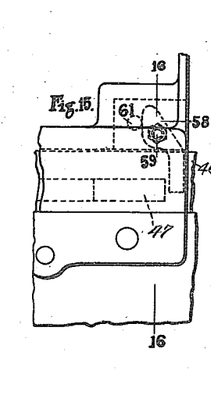
Fig. 15 is a detail side elevation and Fig. 16, a section on line 16—16 thereof, of a plate-traversing-finger trip.
Figure 16:
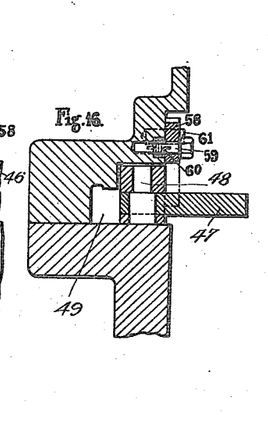

A finger 47 is tripped out of plate-engaging position in time, practically, for the next return motion, by any suitable type of pawl independently arranged, say on the main frame, in such a way that at or near the end of a finger's traversing motion it shall engage and rock the pawl out of its path, and after the finger has passed the pawl the latter is returned by a spring into the return path of the finger in time to rock the latter to within its seating 49 where it is out of plate-engaging position. Such a device is shown in Figs. 15 and 16. 58 is a pawl and 59 its pivot carried by the main frame or a stationary attachment fast to that frame so as to hold the lower part of the pawl in the path of a finger. 60 is a spring encircling the pivot 59 and fast by one end to the frame or attachment and by the other to the said pawl, and constantly urging the top of the pawl 58 into contact with a stop 61 fixed to the frame or attachment on the side of that top toward which a traversing motion is made. There is one of these devices on each side of the apparatus at or near the entrance to each of the fixed positions above mentioned, as shown in Figs. 1 and 2 at 62, 63, 64.

The finger-extension 55 is too short to project into the path of a plate 16 when the corresponding finger 47 is within its seating 49.

After a finger 47 has been put out of plate-engaging position, it must be put into it again in time for its traversing motion to engage the next plate. This is done by a block 65 shown as reciprocable vertically on the respective side frame 1 into and out of the path of each finger-extension 55, and with which that extension engages at or near the end of its return motion.

A traversing motion of the improved traverser is a little longer than the longest plate. For instance, that of the pair of fingers that traverses a plate 16 into the shaving arch 7 is a little longer than that plate, and so with the other pairs of fingers. The object of this extra length is connected with only the first pair of fingers just mentioned. This connection is explained at length further on.

*Improved driving gear.*—After the traverser has traversed a set of plates into their respective new positions, it makes, first, a return motion and then a traversing one, the two constituting one reciprocation. The time of a reciprocation may not be longer than that of a rotation of the shaft 19, to prevent loss of time. Further, a return motion of the improved traverser must be long enough to allow the several pairs of fingers to get into traversing position before their traversing motions take them up to the ends of the plates. Now as it is practically impossible to get a long motion directly from the first motion shaft 39, we have shown special means for providing it. These consist of a series of horizontal motions each derived from a respective circular motion and a motion-prolonging gear between certain of circular and horizontal motions. The power for these special means is taken from the cam shaft 8 through a spiral gear 80 fast on it engaging a second spiral gear 81 fast on a transverse shaft 82 to which is keyed a cam 83 having a face cam groove 84 embracing a roller 85 on a lever 86 fulcrumed at a conveniently positioned point 87 in the main frame. It has already been explained that the shaft 8 has the same rate of rotation as the shaft 19 and as the gears 80 and 81 are equal, the cam groove 84 rotates once and the lever 86 makes one reciprocation for each rotation of the said shaft 19. The special means begin at the roller 85 and their details may be varied. 88 is a link from the top end of the lever 86 to a block 89 sliding in a horizontal guide fixed on the main frame. One face of this block 89, preferably the top one, carries or constitutes a horizontal rack 91 facing upward and engaging a gear 92 axially fast to a larger one 93 on each side of the apparatus and driving a gear 94 axially fast to a larger one 95 which engages with a rack 96 integral with the respective traverser bar 46. The three gears 92, 93, 93, are carried by a transverse shaft 97 and the four gears 94, 95, 94, 95, by a transverse shaft 98. From the roller 85 to the rack 91, is the first change; and from the gears 92 to the rack 96, the second one.

Figures 17, 18:
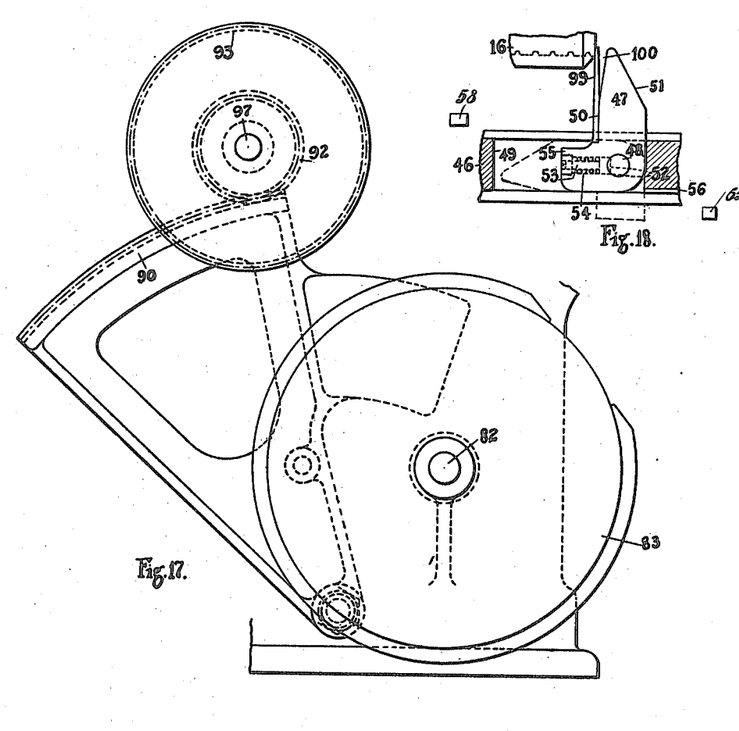
Fig. 17 is a detail side elevation of a modified driving gear for the traverser.
Fig. 18 is a detail sectional plan of the plate-rebound-preventer or absorber.

Fig. 17 shows one variation in the details of these special means. According to it the link 89, guide and rack, are replaced by a segment gear 90 on the outer end of the lever 86 and gearing with the gear 92.

2. *Improved rebound preventer or ab-*

*sorber.*—The rebound referred to is that of an unmachined plate from the plate-stop at the exit-end of the shaving arch 7 and with which stop its leading end comes into contact at the moment it has been traversed along the runway into that arch. The known devices for the prevention or the absorption of this rebound, so far as we are aware, depend upon the relative strengths of springs. If the slide of a gravity fed plate into the shaving arch is at all late, such a device may fail to act properly on the plate and the consequence of that is that one of the knives for dealing with the ends of the plate is broken, or, what is worse, the plate itself may come to rest at a short distance from the said stop, the consequence of which incorrect position is that the cut by the plate-end knife next the stop is too shallow longitudinally, that by the opposite one is too deep, and the adjacent end of the concave face of the plate (because it is then overlapping the respective boring knife 15), is not bored at all, whereby the plate is spoilt. The improved device is shown best in Fig. 18. It possesses either of two capacities, that of absorbing any back-lash that may show itself in the improved traverser-driving gear as well as of any rebound of a plate 16 from the exit-stop in the shaving arch 7, in which case it is a cushioning device located in the special means above described, between the lever 86 and the rack 91, or that of absorbing only the stated rebound of a plate 16, in which case it is located between the first pair of fingers 47, viz., the pair that traverses a plate into the arch 7. The latter arrangement is shown in Fig. 18, and consists of a bar spring 99 secured to a finger at a point, preferably, near its pivot 48 and, in any case, constituting its plate-engaging face, and an intermediate space shown as a recess 100 in the adjacent face of the finger. The dimension of this recess in the direction of a traversing motion of the improved traverser, is equal to the already described extra length of that motion. The action is that when the said pair of fingers has traversed a plate 16 up to the said exit-stop, the spring 99 absorbs any rebound that may be generated in it by its impact with that stop, and the pair of fingers continuing to traverse, make the said springs follow the plate up, in which act the springs are backed up by the fingers.

*Plate-clamping means*, (Fig. 3.)—The actions of the plate-support 11 and the plate-clamp 12, are exactly as described in the specification of British Letters Patent No. 11139 of 1912, but the present invention moves the respective cams 9, 10, from the shaft 19 to the cam shaft 8.

Figure 3:
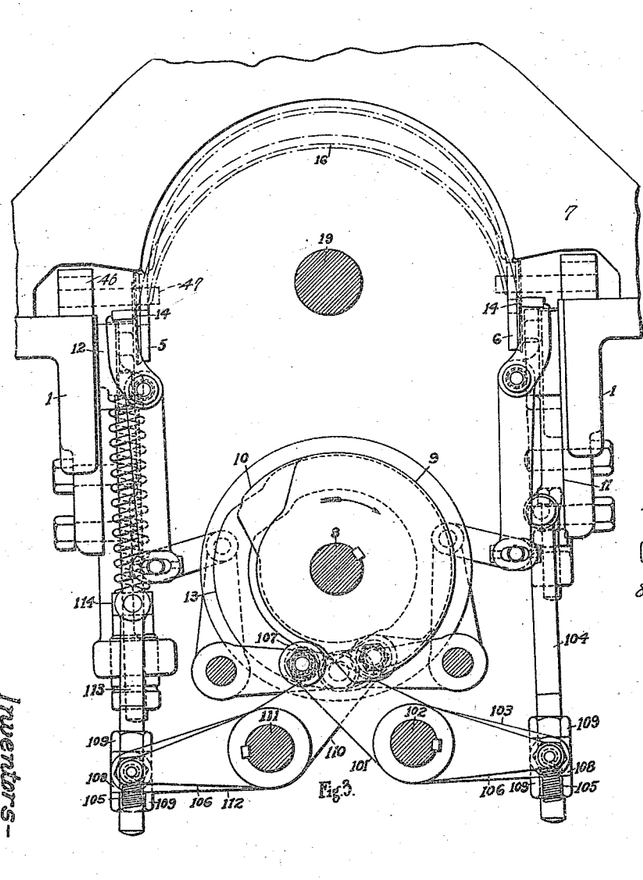
Fig. 3 is a front elevation of the plate clamping and springing devices.
Figure 4:
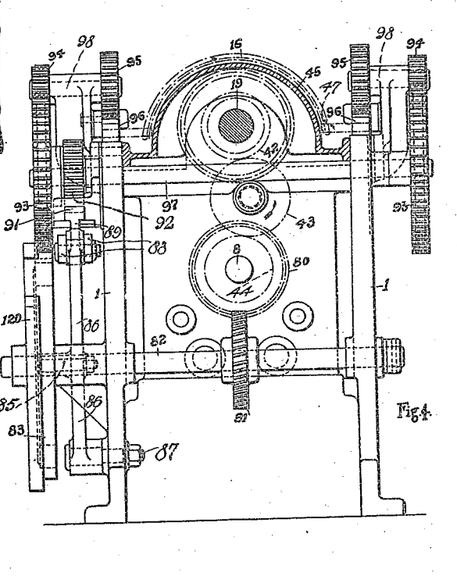
Fig. 4 is a section on the line 4—4 of Fig. 1 of the traverser.

The connection between the cam 9 and the plate-support 11 consists of an arm 101 fast on a rock-shaft 102, another arm 103 fast on the same shaft on the opposite side of it for each of the links 104, and the latter. 105 is a spring pulling from a fixed point on the respective side frame, on an arm 106 fast on the shaft 102 to keep the roller 107 on the arm 101 in constant contact with the cam 9. The bottom end of each of as many links 104 as there are, is passed through a block 108 pivoted on the outer end of the respective arm 103 and screw-threaded to carry a nut 109 above and one below the block to adjust the distance which the constant rise of the arms 103 can raise the support 11, as may be required by variations in the versed sines of the plates.

The connection between the cam 10 and the plate-clamp 12, consists of an arm 110 fast on a rock-shaft 111, another arm 112 fast to the same shaft on its opposite side for each of the links 113 connected to the horizontal bar 114, also shown in said patent. The connection between this bar and the plate-clamp 12 is as described in the specification of that patent. The spring 105, arm 106 and adjusting devices for the links 113, are as just described with reference to the links 104.

3. *Plate-springing-in jaws*, (Fig. 3.)— The object of the third part of the invention is to prevent the normal action of the springing-in jaws 14 being frustrated by malformation on the typeless margins of a plate 16. These margins are theoretically plane vertical surfaces parallel with each other and both at a common distance from the versed sine of the plate. When they are properly positioned, the said jaws move both sides of the plate through an equal distance,—the one calculated for. These surfaces are formed by what are known as the bolsters on the matrix at the time of casting, the bolster on each margin of the matrix, forming the respective typeless margin and projecting into the mold for that purpose, whereby each margin is sunk in the plate relatively to the type surface of the latter. It is practically impossible to rely upon both the matrix margins being and continuing to be true to standard. Either or both bolsters may break at any point in their respective lengths and the consequence is a lump on the respective typeless margin of the plate. Such a breakage may happen with the first plate cast or with the last one or with any intermediate one. Whenever it may happen, every plate cast afterward will have a lump accordingly. If that lump, say on one margin only, comes in the path of a jaw, that side of the plate is sprung too far toward the other. If there is a similarly placed lump on each margin, both sides of the plate are sprung too far. And springing together too far, means that the boring knife will cut too deeply into one or both sides of the plate. Further, any lump, no matter what the position, modifies the effect of the law of momentum already referred to. If one is so positioned as to hit a side stop at the exit-end of the shaving arch, the plate is kicked to one side with the consequence that all the machining done in the said arch, is at an angle with the axis of the plate whereby the latter is spoilt.

The action of the plate-springing jaws 14, 14 and their actuating cam 13 is exactly as described in the specification of the said Letters-Patent No. 11139 of 1912, but the advantages of that action are much increased by reason of the facts that the constant and regular horizontal action of the traverser on both following ends of the typeless margins of a plate simultaneously, prevents the latter from varying either the rate or the direction of its motion along the runway 5, 6, and that if there is a lump, even of a material size and on the leading end of the margin, it cannot be productive of any mischief because it must cut a gash in and through itself against the respective jaw, large enough for the plate to continue its motion up to the exit-stop, without suffering any lateral deviation on the runway. The front ends of the jaws 14, may be sharpened to facilitate their gashing action.

4. *Improved means for locating a plate at the head of the runway.*—The object of this part of the invention is to prevent an unmachined plate being traversed toward the shaving arch 7, if it is located by the attendant on the runway in any position other than that in which the first pair of fingers is intended to engage it. Such traverse is prevented in spite of the next traversing motion of the traverser, by the respective blocks 65 whose function it will be remembered is to rock the first pair of fingers 47 into plate-engaging position and which pair of blocks are for the purpose of this object, retractable, being automatically held out of the return path of the respective finger-extensions 55 whereby the respective fingers 47 cannot be rocked into plate-engaging position.

For the reason that the length of plate to be machined may change at any time, the invention arranges that a plate is set in any of the fixed positions above mentioned, *i. e.*, in either the shaving arch 7, on the main cooler 20, or on the drier 34, with its following end flush with the respective end of the said arch, cooler, or drier, as the case may be, and this irrespective of the length of the plate.

Three improper locations of a plate are possible to the attendant. He may push the plate off the receiving table too late or he may not push it far enough or he may push it too far. The proper position is indicated in Fig. 6 which also shows the pair of blocks 65 in position for rocking the respective fingers 47 into plate-engaging position.

Figure 5:
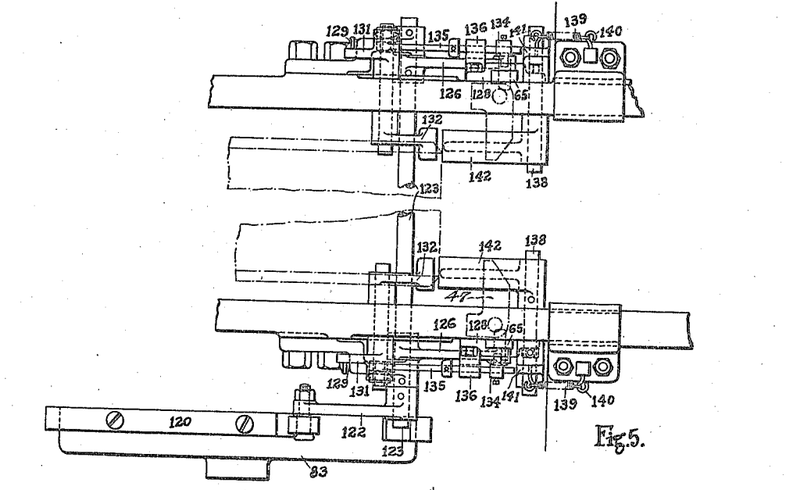
Fig. 5 is a detail plan of the plate-locating means.
Figure 6:
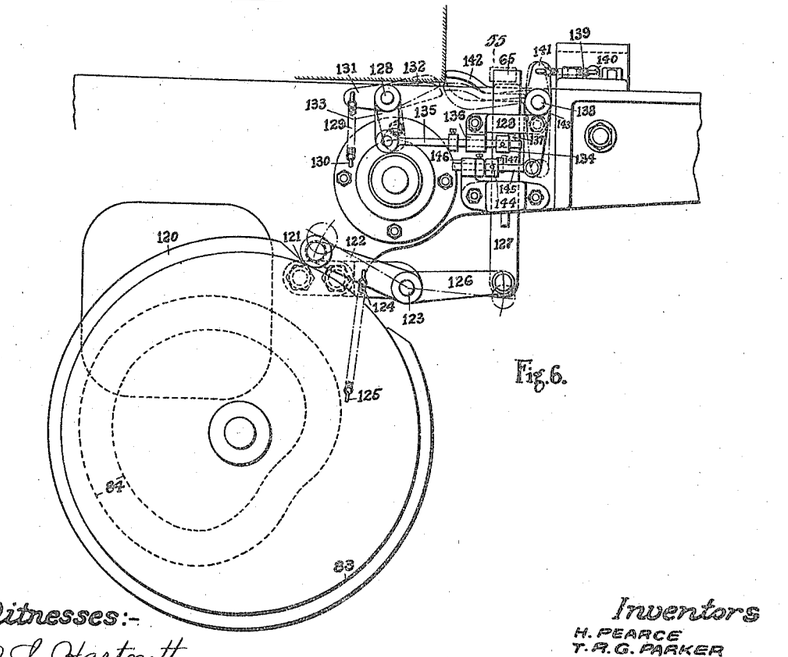
Fig. 6 is a side elevation corresponding therewith.

The means by which the pair of blocks 65 is controlled, are shown best in Figs. 5 and 6. Referring to them, 120 is a peripheral cam integral with the cam 83 which, it will be remembered, rotates once for each motion of the traverser. The cam 120 nearly surrounds the cam 83, leaving a gap 121. 122 is an arm fast on a rock shaft 123 extending across the main frame and held in constant contact with the cam 120 by a spring 124 pulling on it from a fixed point 125 on the said frame. 126 is an arm fast to each end of the rock shaft 123 and having its outer end pivotally connected to the bottom end of a slide 127 working in guides 128 fast on the side frame 1 and having the block 65 at its top end. So that once in each revolution, the gap 121 (and it is properly positioned for the purpose) would allow the spring 124 to put the pair of blocks 65 into position for rocking the respective fingers 47 into plate-engaging position, if that gap did not find the said blocks otherwise locked out of that position.

These blocks are so locked to meet the case of either a too-late or a too-far location, by the combination on each side of the apparatus, of what is practically a three-armed lever fulcrumed on the respective side frame 1. A spring 129 pulling from a fixed point 130 on the side frame, on one arm 131, holds the opposite one 132 in the path of the straight side edge of a plate on its way from the table 2, and at the same time makes the third arm 133 place a detent 134 fast on a rod 135 pivotally connected to the last-mentioned arm and working in a suitable fixed guide 136, over a lug 137 fast on the slide 127. So that, if the following end of an unmachined plate is not holding down the arms 132, and obviously it will not be doing that in either of the two cases just put, the springs 129 will be locking the blocks 65 out of finger-rocking position.

To meet the case of a not-far-enough location, they are locked by the combination likewise on each side of the apparatus, of a practically three-armed lever fulcrumed at 138 on the side frame 1. A spring 139 pulling from a fixed point 140 on that frame, on one arm 141 of the three, holds a second one 142 in the path of the straight side edge of a plate on its way from the table 2. At the same time this makes the third arm 143 place a detent 144 fast on a rod 145 pivotally connected to the last-mentioned arm and working in a suitable fixed guide 146, out of the path of a lug 147 fast on the slide 127. So that if the following end of an unmachined plate is holding down the arms 142, and obviously it will be doing that if the attendant has not pushed it far enough along the runway, it will be also locking the blocks 65 out of finger-rocking position.

5. *Improved plate-stop at the exit-end of the shaving arch.*—The object of this part of the invention is to provide at the exit-end of the shaving arch a plate-stop adjustable to deal with any one of the several lengths of plate, the apparatus has to machine. Heretofore, the leading end of a plate has registered with the exit end of the arch and therefore only one stop was necessary. But seeing that the present invention registers the following end of a plate with the entrance end of the shaving arch, the position of a leading end within the arch will vary according to the length of the plate. To meet this new condition, the present invention provides as many stops as there are different lengths of plate to be machined by one and the same apparatus. It may be explained at this point that one plate prints one page of a newspaper and that the change in plate-length may be expected to occur only when an apparatus ceases to cater for a newspaper having one number of columns to a page and begins to cater for one having a different number.

Figures 7, 8, 9:
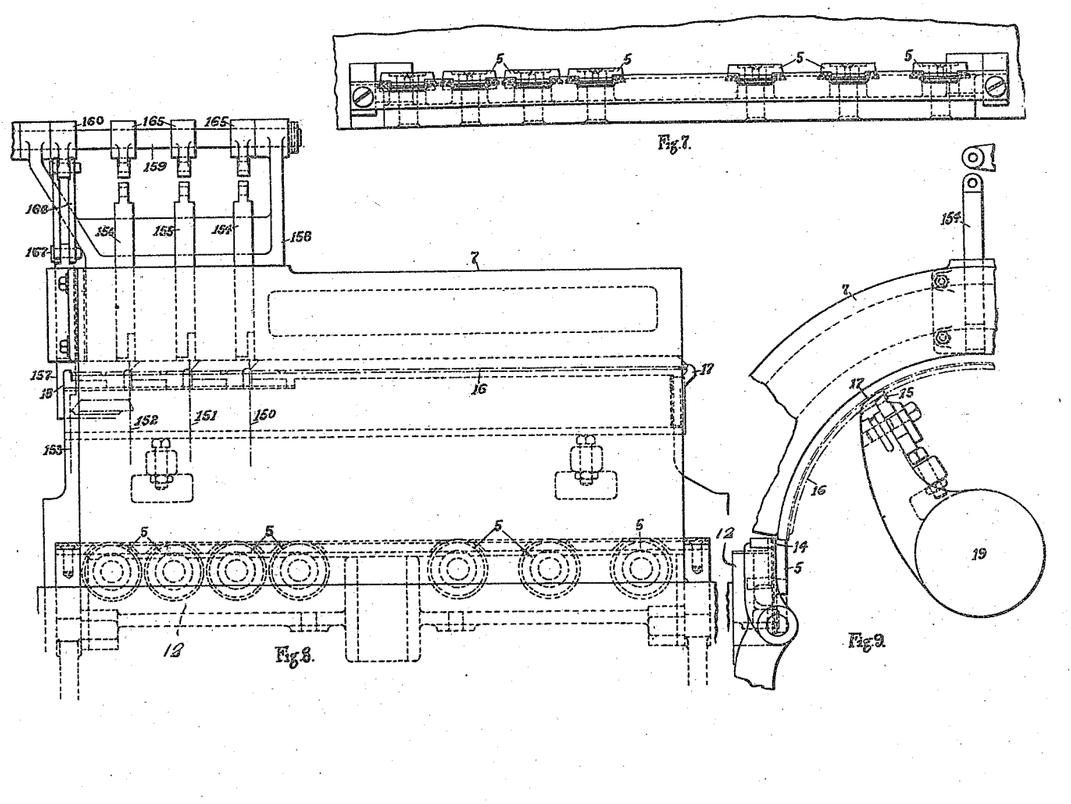
Fig. 7 is a detail plan of the roller track within the shaving arch.
Fig. 8 is a detail side elevation of the shaving arch, its runway, and plate stop at the exit end of it.
Fig. 9 is a half front elevation of Fig. 8.
Figure 10:
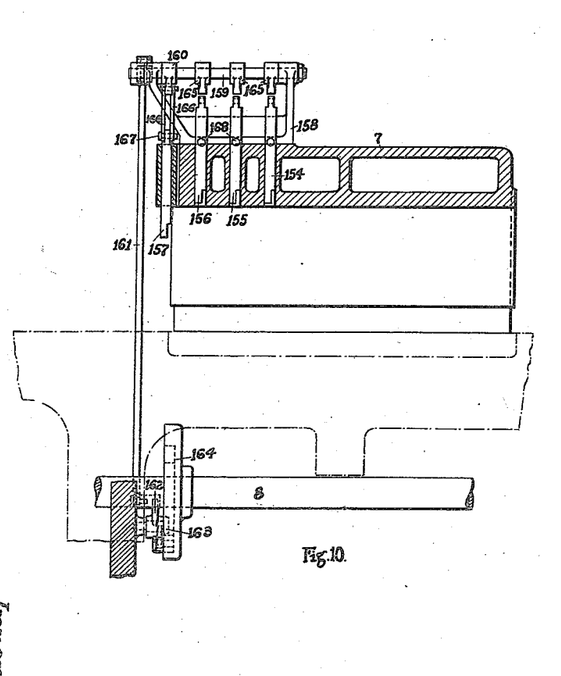
Fig. 10 is a detail sectional side elevation of the plate-stops at the exit end of the shaving arch.
Figure 11:
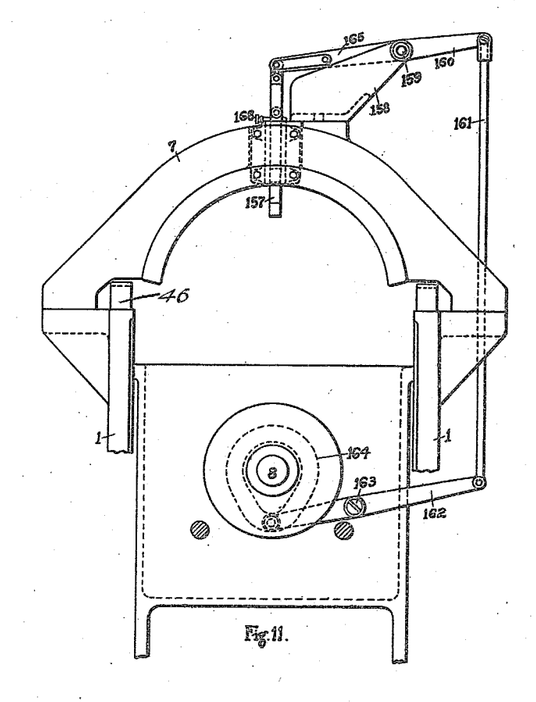
Fig. 11 is a front elevation corresponding therewith.

So long as the plates were traversed through the apparatus by gravity, it was necessary for the stop to be maintained in the plate-stopping position until after the plate-support 11 and plate-clamp 12 had both been lowered to the runway level (excepting for a short time during the boring cycle when the stop was moved away to clear a plate-end-grooving knife). Otherwise a plate would have begun to slide out of the arch before the said support and clamp were flush with the said level. But now that the traverse is a horizontal and mechanical one, that necessity has disappeared. It is enough for the purpose of the present invention, that the stop in use shall be in plate-stopping position only just in time to stop the plate at the moment it is far enough into the arch to be clamped and to remain there until the bored plate is ready to leave the arch. The means by which the said objects are attained are shown best in Figs. 8 to 11. Referring to them, the apparatus is supposed to be capable of machining plates of four different lengths of, respectively, 7, 8, 9 and 10 columns. The leading end of each length will therefore occupy the respective one of the four positions 150 to 153 shown in Fig. 8. As there are four different lengths, there are four stops 154 to 157. As the arch 7 is as long as the longest plate-length, the respective stop 157 works outside and past the crown of that arch, while the other stops 154, 155, and 156, work through the crown near the exit-end of the arch. 158 is a bracket fast upon the top of the arch 7 and so proportioned as to provide the fulcrum, or to support a fulcrum rod 159, for a transverse lever 160 the outer end of which is connected by a link 161 to the outer end of a lever 162 fulcrumed at 163 and having its opposite end fitted with a roller engaged in a grooved cam 164 on the shaft 8. In the case of an apparatus to machine only one length of plate, the single stop 157 is carried by the inner end of the lever 160, but if there is a plurality of stops, the inner arm of the lever becomes a plurality of arms 155. In either case, each stop is connected to the respective arm by a pair of links 166 pivoted by their top ends to the outer end of the latter and by their bottom ends to the top of the stop. All the stops excepting the one to be used, are put out of action for the time being, preferably by being put out of working position. This is done by withdrawing the respective pivot pins 167 from the bottom end of the links 166, swinging the links upward, pinning them to the respective arms 165, and holding up each idle stop by a pin 168.

The boring knife 15 is as long as the longest length of plate so that no change or adjustment of it is necessary, but the knife 18 for grooving the leading end of a plate 16, is adjustable in the radial arm that carries it, in a direction parallel with the length of a plate, in order that it may be set to act upon any length of plate.

Figure 12:
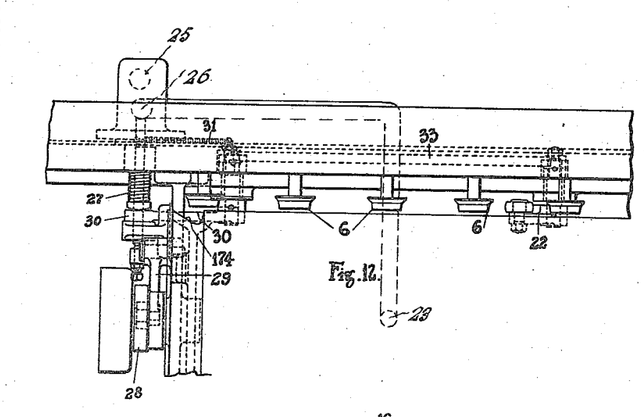

6. *Improved main cooler*, (Figs. 12 and 13.)—In an apparatus through which the plates were traversed by gravity down an inclined runway, the main cooler was necessarily inclined to the same angle. To insure an even delivery of water through the crown of the saddle under that condition, it was necessary to divide the surface of the saddle transversely into compartments as follows. For each compartment there was a special supply pipe delivering into a chamber under the crown of the saddle and from which a small number of ports through the crown, delivered jets into respective recesses and against respective baffle plates. As a result of the present invention, the known symmetrically positioned supply pipe 23 delivers into a single chamber 170 from which the water passes through a single longitudinal port 171 along the crown of the saddle 20. With an inclined saddle there was always more or less overflow over the exit-end of the saddle and none over the entrance end. As a further result of this invention, the overflow if any is equal at both ends and is received in an end gutter 174 delivering into the usual waste pan 175.

Although we have illustrated and described only several forms of our invention, we are aware of the fact that many changes and modifications can be made therein by those skilled in the art without departing from the spirit and scope of the invention as expressed in the claims. Therefore, we do not wish to be limited to all the details of construction herein shown and described, but what we do claim is:—

1. In an apparatus for machining curved stereotype plates, the combination with a runway along which plates of different lengths and weights can travel, of a horizontally reciprocating traverser bar on each side of the apparatus at the level of the runway, a finger on each bar for each motion of the plate, the fingers on one bar being respectively opposite those on the other, and located thereon to engage with the following end of a plate so as to push it along the runway, means for making the fingers during their return motions clear the respective plates, means for replacing them in plate-engaging positions in time for their next traversing motions, and means for reciprocating the two bars in unison.

2. In an apparatus for finishing curved stereotype plates, the combination with a runway along which the plates can travel, of a horizontally reciprocating traverser bar on each side of the runway at the level thereof, a finger located on each bar for engaging the plate and moving it along, means for causing the fingers during their return motions to clear the stereotype plates, a pivot on which each finger is located on its bar, and means for stopping the pivoted finger in its two limiting positions and locking it there.

3. In an apparatus for finishing curved stereotype plates, the combination with a runway along which the plates can travel, of a reciprocating traverser bar on each side of the runway at the level thereof, a finger located on each bar for engaging the plate and moving it along, each bar also having an abutment for supporting the finger throughout its traversing motion, means for putting each finger out of plate-engaging position at the end of each motion, and means for returning it into plate-engaging position in time for its next traversing motion.

4. In an apparatus for finishing curved stereotype plates, the combination with a runway along which the plates can travel, of a reciprocating traverser bar on each side of the runway at the level thereof, a finger movably located on each bar for engaging the plate and moving it along, a pawl pivoted on the main frame of the apparatus in position to be engaged by a plate, a spring for holding said pawl, means for putting each finger out of plate-engaging position at the commencement of its next motion, said finger having an integral extension thereon, and a block on said frame for engaging said extension and returning the finger into plate-engaging position in time for its next plate-traversing motion.

5. In an apparatus for finishing curved stereotype plates, the combination with a runway along which the plates can travel, of a horizontally reciprocating traverser bar on each side of the runway, rotary means for reciprocating the two bars in unison with a series of intermittent horizontal motions, a finger located on each bar for engaging the plate and moving it along, means for causing the fingers during their return motions to clear the stereotype plates, and means for placing them in plate-engaging position in time for their next traversing motions.

6. In an apparatus for finishing curved stereotype plates, the combination with a runway along which the plates can travel, of a horizontally reciprocating traverser bar on each side of the runway at the level thereof, a main shaving knife shaft, a cam, means for rotating said cam at the same rate as said shaft, means operated by said cam for reciprocating the two bars intermittently, a gear for prolonging each reciprocation, a finger located on each bar for engaging the plate and moving it along, means for causing the fingers during their return motions to clear the stereotype plates, and means for placing them in plate-engaging position in time for their next traversing motion.

7. In an apparatus for finishing curved stereotype plates, the combination with a runway along which the plates can travel, of a reciprocating traverser bar on each side of the runway, a finger located on each bar for engaging the plate and moving it along, means for placing the fingers in plate-engaging position in time for each traversing motion, a cam, a lever arranged to be oscillated by said cam, a horizontally sliding rack connected with said lever, a gear engaging said rack, a larger gear rotating with the first named gear, two gears of different diameters fixed to each other, the smaller one meshing with the first named larger gear, and a rack connected with one of said traversing bars and meshing with the larger one of said two gears for operating the traversing bars.

8. In an apparatus for finishing curved stereotype plates, the combination with a runway along which the plates can travel, of a horizontally reciprocating traverser bar on each side of the runway, a finger located on each bar for engaging the plate and moving it along, a pivot on which each finger is located on its bar, and a cushioning device on each of said fingers for following up the plate and absorbing any back lash in the reciprocation and any rebound in the plate.

9. In an apparatus for finishing curved stereotype plates, the combination with a runway along which the plates can travel, of a reciprocating traverser bar on each side of the runway at the level thereof, a finger located on each bar for engaging the plate and moving it along, a pivot on which each finger is located on its bar, means for stopping the pivoted finger in its two limiting positions and locking it there, each of the first pair of fingers on the two bars being provided with an operative face having a bar spring secured thereto, and projecting therefrom transversely to the direction of motion, said finger and bar having a space between them toward the end of the spring.

10. In an apparatus for finishing curved stereotype plates, the combination with a shaving arch having a runway along which the plates can travel, of a reciprocating traverser bar at the side of the runway, a finger located on said bar for engaging the plate and moving it along, and a plate springing jaw in the shaving arch having means for gashing any lump on the margin of the plate that may come into contact with it.

11. In an apparatus for finishing curved stereotype plates, the combination with a shaving arch having a runway along which the plates can travel, of a reciprocating traverser bar on each side of the runway, a finger located on each bar for engaging the plate and moving it along, means for causing the fingers during their return motions to clear the stereotype plates, means for placing them in plate-engaging position in time for their next traversing motion, and means controlled by the location on the runway of an unmachined plate for replacing the fingers into position for traversing the plate into the shaving arch.

12. In an apparatus for finishing curved stereotype plates, the combination with a shaving arch, and a runway along which the plates can travel, of a reciprocating traverser bar on each side of the runway, a finger located on each bar for engaging the plate and moving it along, means for causing the fingers during their return motions to clear the stereotype plates, means for placing them in plate-engaging position in time for their next traversing motions, and means operative for replacing the fingers into position to engage a plate and move it into the shaving arch.

13. In an apparatus for finishing curved stereotype plates, the combination with a shaving arch, and a runway along which the plates can travel, of a reciprocating traverser bar on each side of the runway, a finger located on each bar for engaging the plate and moving it along, means for causing the fingers during their return motions to clear the stereotype plates, a cam operating synchronously with the traversing bar, and means controlled by said cam for replacing the fingers in plate-engaging position after they have moved a plate into the shaving arch.

14. In a machine for finishing stereotype plates, the combination with a shaving arch, and a reciprocating traverser bar having a movable finger thereon for engaging the plate and moving the plate into the shaving arch, of means controlled by the position of an unmachined plate for operating said finger into position to engage the plate, and means operating synchronously with said traversing bar for replacing the finger in plate engaging position.

15. In an apparatus for finshing curved stereotype plates, the combination with a shaving arch, and a runway along which the plates can travel, of a reciprocating traverser bar on each side of the runway, a finger located on each bar for engaging the plate and moving it along, means for causing the fingers during their return motions to clear the stereotype plates, a cam connected to rotate once for each reciprocation of the traverser bars having a single gap therein, finger replacing blocks, transversely reciprocable slides on which said blocks are located, means for connecting the cam with said slides for operating them, and a spring for moving the blocks into position for replacing the fingers in plate-engaging position, the gap in said cam being arranged to permit the operation of said spring periodically.

16. In an apparatus for finishing curved stereotype plates, the combination with a shaving arch, and a runway along which the plates can travel, of a reciprocating traverser bar on each side of the runway at the level thereof, a finger located on each bar for engaging the plate and moving it along, a three-arm lever, a spring connected with one of said arms to hold another one in the path of an unmachined plate on the runway, a finger replacing block, means connected with the third arm of said lever for holding the plate replacing block out of operative position, and means operated by said block for replacing the finger into position for traversing a plate into the arch.

17. In an apparatus for finishing stereotype printing plates, the combination with a shaving arch and a runway therefor, of a series of stops for the plate located at different positions along the runway near the exit-end of the arch, and means whereby all of said stops but one can be put out of action for the purpose of using the desired one of them.

18. In an apparatus for finishing stereotype printing plates, the combination with a shaving arch and a runway therefor, of a series of stops for the plate located at different positions along the runway near the exit-end of the arch, means whereby all of said stops can be put out of action for the purpose of using the desired one of them, and a knife for cutting the leading edge of the plate adjustable in the direction of the length of the arch.

In testimony whereof we have hereunto set our hands in the presence of two subscribing witnesses:

HERBERT PEARCE.
THOMAS ROBERT GILLETT PARKER.
WILLIAM EDWARD BENNISON.

Witnesses:
MALCOLM SMETHURST,
ERNALD SIMPSON MOSELEY.

Copies of this patent may be obtained for five cents each, by addressing the "Commissioner of Patents, Washington, D. C."